Feb. 23, 1932.   W. F. BUSSE   1,846,510
PROCESS AND APPARATUS FOR TREATING SEEDS
Filed Oct. 13, 1928
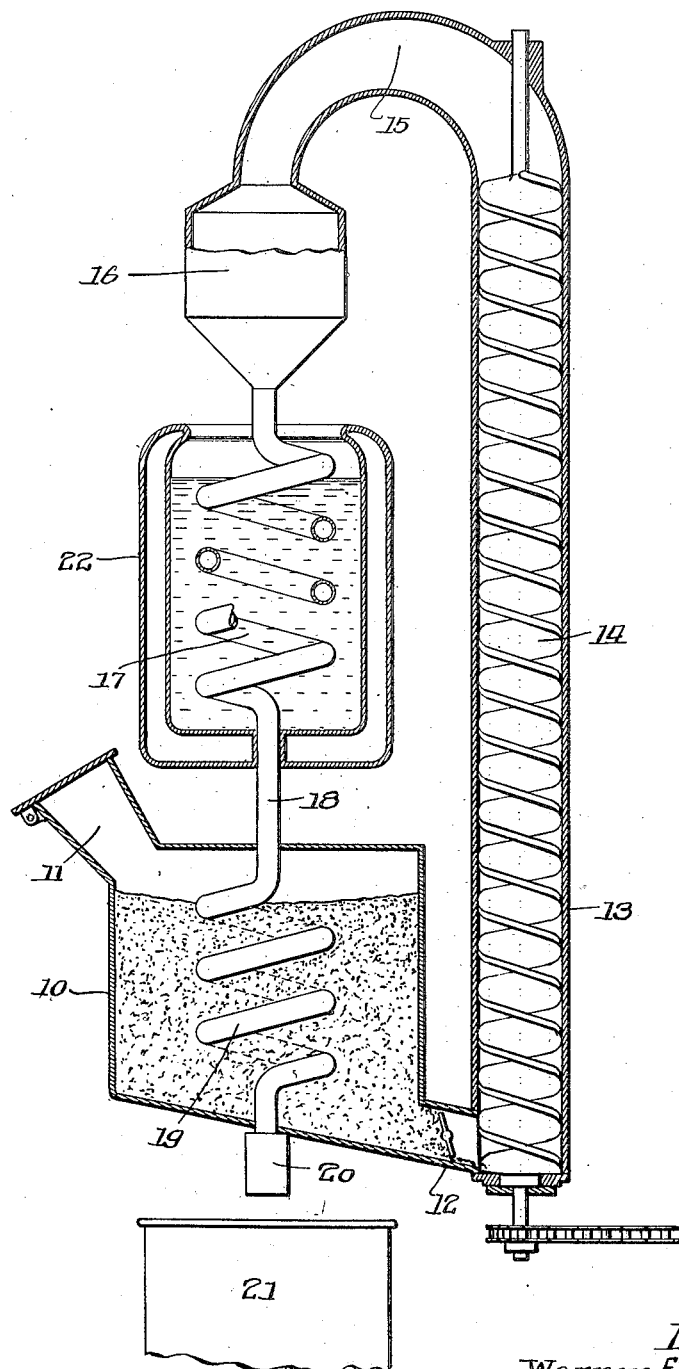
Inventor,
Warren F. Busse
By George I. Haight
Atty.
Witness
William P. Kilroy Patented Feb. 23, 1932

1,846,510

UNITED STATES PATENT OFFICE

WARREN F. BUSSE, OF AKRON, OHIO

PROCESS AND APPARATUS FOR TREATING SEEDS

Application filed October 13, 1928. Serial No. 312,255.

My invention relates to improvements in process and apparatus for treating seeds.

For many years persons engaged in producing and handling seeds of various kinds, and more particularly, those of the legume family, such as clover and alfalfa, have noted that sometimes a large proportion of the viable seeds do not germinate when placed in the ground. Experiments conducted in connection with most largely used varieties of clover and alfalfa seeds, have shown that in some cases only very small portions actually germinate. For instance, in the case of Grundy County sweet clover, certain lots disclose germination of only 14% of the total sown; other better lots of the same variety of clover seed disclose germination up to 53% of the total. Certain lots of common sweet clover showed a percentage of about 60% of the total sown germinating. In the case of alfalfa, one sample of Dakota alfalfa disclosed that about 65% of the total sown germinates. Idaho alfalfa showed about 52% germinating. Although only the varieties of seeds above referred to were experimented with, it is practically certain that somewhat similar conditions obtain in connection with all varieties of alfalfa and clover.

According to Government statistics, there are approximately 94,000,000 pounds of clover seed produced annually and approximately 45,000,000 pounds of alfalfa seed produced every year. When it is considered that a substantial proportion of the seed so produced fails to germinate, when sown, the losses involved due to this factor are very large.

Investigations into the causes of failure of the large percentage of viable seeds to germinate have been extensively undertaken in the past and it is now definitely established that one of the chief reasons the seeds do not germinate when placed in the ground is that they have hard or impermeable casings, these seeds being commonly known among persons familiar with seeds as "hard seeds". These "hard seeds" occur in varying proportions in many different varieties of clover and alfalfa, and are also found in varying proportions in yellow trefoil, okra, hollyhock, asparagus, morning glory, canna and cherry tomato seeds. In the varieties of seeds referred to, it is quite generally conceded that the proportion of "hard seeds" in a given quantity of seeds bears a relation to the seed which will not germinate when sown; in other words, the larger the proportion of the "hard seeds" in a given lot of seeds, the lower will be the percentage of seeds which germinate when sown.

Each unit of the "hard seeds" referred to is known to contain a live embryo which does not develop under normal germinating conditions because moisture or other materials necessary for growth, cannot penetrate the seed coating or casing so as to reach the embryo. Inasmuch as the moisture and other material necessary to growth must come from without the seed, it is obvious that they must pass the casing member, and in the case of "hard" dry seeds, where the necessary materials cannot penetrate the impermeable casing, some means must be utilized for aiding in this necessary function.

As above stated the necessity for artificially aiding in the germination of hard seeds is well recognized, and means have been employed to effect the desired result. For instance, one method is to scarify the seed, that is, to partly destroy or break up the casing so that the same is weakened sufficiently to be permeable to moisture in its weakened or partly destroyed condition. This is accomplished in various ways, among which are the scratching or abrading of the seeds; such, for instance, as results from throwing the seeds by suitable appliances against sand paper. These methods of mechanical action upon the seed casing are objectionable in that the seed casing is apt to be so far destroyed that the seed itself will rot or otherwise lose its vitality through exposure. Also, from the nature of the means employed, inequalities of treatment occur. Further, there is considerable likelihood of mechanical injury to the embryo in the seed. Another method proposed for accomplishing the purpose is to destroy the seed casing by chemical action, as for instance, the immersion of the seeds in a strong sulphuric acid bath. This method is objectionable for the same reasons noted in connection with the mechanical methods referred to, that is, the seed casing is injured and the seeds must be used immediately. There is also possibility of injury to the embryo. Further, the acid which is utilized in connection with the seeds must be neutralized after treatment to prevent destruction of the seeds.

In connection with all of the methods referred to, there is one paramount objection which resides in the fact that the seeds are injured and the keeping qualities very much impaired. The desirable result to accomplish therefore, must be a treatment of the seeds which will improve germinability without injury to the seeds, and preserve them in condition for reasonably long keeping. To accomplish this result, as may be deduced from the foregoing, the casing of the seed must be altered sufficiently to render the same permeable to moisture, or to any other action which may occur when the casing is altered, and at the same time not alter the casing sufficiently to make the seed subject readily to deterioration.

A general object of the present invention, therefore, is to provide an improved method and apparatus for treating seeds, wherein the casings of the seeds are altered in such manner that they become permeable to outside materials and their germinability improved.

Another object of the invention is to provide a method and apparatus for the treatment of seeds wherein the seed casings are altered under such conditions that the germinability of the seeds is improved without affecting the keeping properties thereof.

A further object of this invention is to provide a method of treating seeds which consists in selecting lots of seeds of a predetermined maximum moisture content which give low germination tests because of the presence of seeds with impermeable casings, and providing a medium of intense cold, far below that of atmospheric temperatures, which must be artificially produced, and subjecting the seeds to the influence of said medium whereby the combined influence of the cold and the peculiar reaction of the seed casing to the cold are employed to increase the germinability of the seed at normal temperatures.

Still another object of the invention is to provide a method and apparatus wherein seed of a predetermined type are subjected to cold below atmospheric temperatures, warmed above said temperatures and again subjected to the intense cold below atmospheric temperatures whereby the germinability of the seed is improved.

Another object of the invention is to provide a process which consists in providing a medium of intense cold, giving to "hard" dry seeds a superficial coating of moisture or other suitable liquid, and then subjecting the seeds to the influence of the cold medium.

A still further object of the invention is to provide a process which consists in selecting seeds of different ages and moisture content and subjecting the same to the cold medium at temperatures depending upon the age and moisture content of the seeds.

It is also an object of the invention to provide a process which consists in selecting seed in which the moisture content is such as to permit the subjection of the seed to intense cold, whereby the germinability of the seeds so subjected is improved and the plants grown from the treated seeds stimulated in growth.

Still another object of the invention is to provide a medium of intense cold such as liquid air, select seed at normal temperatures having a predetermined moisture content, and a proportion of "hard" seed, subject said seed to the cooling influence of the liquid air, and permit the seed to regain warmth thereby improving the germinating qualities of the seed.

Other and further objects of the invention will more fully and clearly appear from the description and claims hereinafter following.

In the drawing forming a part of this specification, the figure represents an essentially diagrammatic view of an apparatus through the use of which the process may be practiced.

Broadly speaking, it has been found that air dried seeds, of the character heretofore referred to, with a moisture content of about 10% are not injured by being subjected to intense cold, and the "hard seeds" included in a given lot of seeds are beneficially affected by subjection to cold in accordance with the present process, to such an extent that the germinability thereof is greatly increased, and in some cases the growth of the plants from said seeds materially stimulated.

As above stated, in the case of certain kinds of seeds produced in ordinary commercial qualities, the seeds almost always have a large percentage of "hard seeds". Different lots of seeds may vary considerably in moisture content, while the "hard seeds" contained within each lot also vary regardless of the moisture content of any lot of seeds. In other words, a given lot of seed as commercially produced, may have an average moisture content approximately 10%, and contain a considerable proportion of "hard seeds". Also a given lot of seed having a considerably higher moisture content, may also have a large proportion of "hard seeds" included therein.

Experiments have demonstrated that all seeds, in which "hard seeds" occur, having a moisture content approximating 10% may safely be subjected to very low temperatures without injury to any of the seeds, and with great benefit in improving the germinability of the hard seeds. Some varieties of seeds having higher moisture contents than 10%, also may be safely subjected to very low temperatures with considerable improvement in the germinability of the seed so treated, in some cases the moisture content probably ranging as high as 20%. In most cases, however, if seeds having a moisture content vary very much greater than about 10% are subjected to intense cold, they are likely to be injured or killed.

When it is desired to treat a given lot of seed, including a percentage of "hard seed", the average moisture content of the seed is first ascertained, and if it is found through simple tests that the average moisture content does not exceed approximately 10%, the entire lot of seed may be treated without injury thereto. Although as above noted, in some cases seeds having a somewhat higher moisture content probably up to 20% may be treated without danger, it is preferred to treat air-dry seeds having a moisture content of 10% to 12%, as the results produced under these conditions are very satisfactory. In event a given lot of seed has not reached the air-dry state, the entire quantity of seeds may be dried by further air-drying the seed or by applying artificial heat to bring the moisture content of all of the seeds down to approximately 10% to 12% of moisture content, after which all of the seed may be subjected to the freezing process. In carrying out the preferred method or process, a quantity of seeds approximating 10% to 12% moisture content and including a quantity of "hard seed" are selected, or obtained by drying quantities of seed having a higher moisture content, these seeds then being subjected to intense cold such as that provided by liquid air, the boiling point of which is very low and provides a temperature somewhere in the neighborhood of −190 degrees C. The seeds may be introduced directly into the liquid air itself for a relatively short period sufficient to permit the intense cold to penetrate the seed, after which the seeds are withdrawn and permitted to regain heat up to the ordinary atmospheric temperatures. Also the seeds, instead of being directly introduced into the liquid air, may be placed in a container and the container inserted into the liquid air, since the mode of procedure apparently has no effect upon the final result produced. In cases where the seeds are of such character as to withstand the low temperature without injury, even though the moisture content may be somewhat higher than 10% to 12%, of course no pre-drying of the seed is necessary but the same may be subjected to the low temperatures in the same manner as the seeds having a lower moisture content.

Sometimes it becomes desirable to subject the seeds to the liquid air, then allow the seeds to again become heated at atmospheric temperatures, and the seed than again subjected to the liquid air, since this treatment appears to accentuate or supplement the action in improving germinability by a single exposure of the seed to the low temperatures referred to.

Also, with the "hard seed", the desired effect has been found to be facilitated by coating the seeds with a superficial coating of moisture prior to their subjection to the liquid air.

By reason of the above described treatment, it has been found that the germinability of the seeds so treated is greatly improved, sometimes to an almost unbelievable extent. For instance, in the case of Grundy County sweet clover the germinability of a quantity of seed without treatment was found to be 14% of the total. When treated with liquid air in the manner indicated, the germinability was increased to 90% of the total amount so treated. In the case of common sweet clover, without treatment, the germinability was found to be approximately 60% of the total. After treatment with liquid air, the germinability of the same lot of seed was found to be 94%. Dakota alfalfa without treatment showed germinability of 65% of the total when no treatment had been given. In the same lot of seed, after treatment by subjection to the liquid air in the manner indicated, the treated lot of seed showed germinability of 100%. Also, in the case of Idaho alfalfa, 52% of the same without treatment was found to be germinable. After treatment, the seed taken from the same lot was found to have germinability of 100%. It was further observed that the plants grown from the seed treated appeared to grow more rapidly than plants grown from untreated seed.

In connection with the process described above, the treated seeds are rendered immediately germinable and may be used immediately, if desired, or may be stored without the keeping qualities being impaired because of the treatment.

When untreated "hard" seeds are stored under normal conditions, they gradually tend to lose their impermeability and become germinable, but this process may take place very slowly, sometimes requiring decades. This natural loss of impermeability may be accelerated by cooling the seeds with a refrigerant which is not cold enough to make many of the "hard" seeds immediately germinable. However, a few months after giving this treatment, the germination of a lot of treated seeds will be considerably greater than germination of a similar lot of untreated seeds.

In cases where the seed is not going to be planted for some months after treating it, it may be worth while in practice to use refrigerants with temperatures in the upper part of the range from −90° C. to −20° C., such that the impermeability of the seed coat is not greatly affected at the time of treatment but the casing is altered sufficiently so that the natural changes on storage will make the seeds permeable in a few months. In cases where the combination of treatment with cold and storage is used to increase the germinability of seeds, the treatments with cold can of course be given in the apparatus hereinafter referred to.

It has been found that although subjection of the seed to liquid air at the very low temperatures produced thereby, produces what appear to be the best results, nevertheless, the subjection of the seeds to higher temperatures than those afforded by liquid air has been found efficacious in materially increasing the germinability of seed of the character contemplated. In some cases, particularly in connection with seed which is not so dry and so "hard" as the seed treated in the liquid air process, much higher temperatures have been found to have an extremely beneficial effect upon the germinability of the seed treated. In some cases the results obtained have approximated those obtained in connection with the liquid air treatment and in practically all of the experimental tests the germinability of the seed has been found to be materially improved. The higher temperatures referred to particularly are those which are afforded by the use of carbon dioxide snow ($CO_2$ at −80° C.). When Grundy County sweet clover of the same lot referred to in connection with liquid air was treated, it was found that the germinability percentage increased from 14% for the untreated seed to 22% for the treated seed. In connection with common sweet clover, the germinability of untreated seed is found to be about 60%, while the treated seed showed a percentage of germinability of 68%.

The increases in connection with clovers were much less than those noted in connection with the liquid air treatment. However, when Dakota alfalfa was treated with $CO_2$ snow, the germinability of the alfalfa was increased from 65% for the untreated seed to 84% for the treated seed. In the case of Idaho alfalfa seed, the germinability test showed an increase from 52% for the untreated seed to 86% for the treated seed.

Still higher temperatures than those afforded by $CO_2$ snow and up to and including approximately −20° C., and produced by liquid ammonia or other refrigerants, under some conditions, have an appreciable effect upon the "hard seeds" treated, and it must be understood that temperatures higher than those indicated as producing the best results, and conforming substantially to the process and apparatus as described herein, are believed to be within the spirit of this invention.

The effectiveness of any given temperature in improving the germinability of these "hard" seeds depends somewhat on the variety of the seed, on its maturity, on the moisture content and on the time since it was harvested. In general, the sweet clovers require much lower temperatures to make the seeds germinable than do the alfalfa seeds. These seeds may also require lower temperatures in the fall shortly after harvesting than are needed the next spring to make the seeds germinable. The addition of a superficial layer of moisture to the seed slightly facilitates the action of the cooling medium.

An apparatus for carrying out the process when liquid air is used is diagrammatically illustrated in the drawing.

In this arrangement, a hopper 10 is provided having an opening 11 through which the seeds to be treated may be inserted, the the hopper being provided with a downwardly disposed hollow extension 12 communicating with a conveyor tube 13 having a screw conveyor 14 mounted therein, the tube 13 being closed at the bottom and at its top, communicating with a goose neck extension 15 adapted to discharge into a bulbous portion 16. The portion 16 at its lower end communicates with a worm or coil 17, the latter being connected by a portion 18 with a second worm or coil 19, disposed within the hopper 10, the coil or worm 19 terminating in a discharge portion 20, adapted to discharge into a storage bin 21. Surrounding the coil 17 is the refrigerating chamber, provided by a container 22 for liquid air, which may be of double wall construction as in the case of Dewar flask.

When it is desired to treat a quantity of the seeds in accordance with the process, the seeds are inserted into the hopper 10 through the opening 11, and pass by gravity through the extension 12 into the conveyor tube 13. They are conveyed upwardly through the medium of the screw conveyor into the goose neck 15, thence discharging into the bulbous portion 16, passing thence through the worm 17 in the refrigerating chamber, through the connection 18 and worm 19 to the discharge portion 20, discharging into the bin 21. If it is desired to subject the seeds to a second treatment, the seeds from the bin 21 may be reinserted into the hopper 10 and the same cycle of operations repeated. Due to the passage of seeds into contact with the coil 19, when initially inserted into the hopper, these seeds are precooled by the low temperature induced by the passage of the seeds leaving the coil 17.

By utilization of this apparatus, it will be appreciated that the requisite cycles necessary in the treatment of the seed, as described in connection with the process, may be mechanically carried out. If it is desired to add moisture to the seed to be treated it is a simple matter to pour water into the hopper 10 through the opening 11.

When it is desired to use $CO_2$ snow as the refrigerant, it may be placed within the refrigerating chamber of the apparatus surrounding the coil 17. Carbon dioxide snow is now available commercially, and may be obtained cheaply in sufficient quantities for use in connection with the apparatus referred to. As above stated, instead of carbon dioxide snow or liquid air many other refrigerants, such as liquid ammonia, or liquid sulphur dioxide, might be used. As heretofore stated, it does not appear to have any effect upon the benefical result produced by subjection of the seeds to the low temperatures, whether they are directly immersed in a bath of refrigerant, as long as the refrigerant does not induce an injurious chemical effect upon the seeds, or placed within a container subjected to the influence of the refrigerant. It will be understood that any of a large number of well known refrigerating devices and refrigerants may be utilized to produce the requisite low temperatures, providing the seeds are processed in the manner heretofore described in detail.

It is believed that the effectiveness of this process depends on forming minute cracks or other small changes in the impermeable part of the seed coat, through the differential expansion and contraction of the various parts of the seed. Then when the seed is placed under normal germinating conditions these tiny cracks allow sufficient moisture and other materials to penetrate the seed coat to start the swelling of the seed, and once this starts, the force of this expansion quickly ruptures the impermeable layer, allowing water to enter the seed quite freely. However, it is possible that some or all of the refrigerants may act in other ways to change the permeability of the seed coat, and it is understood that any other action which may occur apart from the mechanical effects of the intense cold is also within the spirit of the present invention.

While I have herein shown and described what I now consider the preferred manner of carrying out my invention, the same is merely illustrative, and I contemplate all changes and modifications that come within the scope of the claims appended hereto.

I claim:—

1. A process which consists in the following steps: providing seeds having impermeable casings; employing artificially produced cold below normal temperatures, and subjecting said seeds thereto, to engender germinability, and subsequently raising the temperature of said seeds to atmospheric temperatures whereby said seeds are maintained in condition to germinate for long periods.

2. A method which consists in drying a quantity of seeds including "hard seeds", to render the same uniformly low in moisture content, employing artificially produced intense cold, and subjecting the seeds thereto, and subsequently permitting rise in temperature of said seeds, whereby the germinability of said "hard seeds" is augmented.

3. A method for increasing the germinability of "hard seeds", consisting in employing gases under greater than normal density as refrigerants, and subjecting the seeds to the influence of said gases for the purpose of increasing the germinability thereof when the same are brought to atmospheric temperatures.

4. A process of the character described, which consists in treating seed of low moisture content which include seed having factors inimicable to germination at atmospheric temperatures; subjecting said seed to the influence of liquid air, and subsequently raising the temperature of the seed, whereby the germinability of the seeds is augmented.

5. A method of the character described, consisting in the following steps: selecting leguminous seeds having impermeable casings and low moisture content; employing artificial intense cold below $-20°$ C., and subjecting said seed to the influence thereof, and subsequently increasing the temperature of said seed prior to use, thereby rendering the casings of said seed permeable to moisture and making the seeds germinable.

6. A method for treating seeds consisting in employing sub-normal artificially produced temperatures ranging from the temperature of liquid air upwardly to $-20°$ C., and subjecting the seed to a temperature within said range tending to alter the seed, and subsequently raising the temperature before use of the seed, whereby the germinability of said seed is increased.

7. A method of treating seeds of different ages and moisture content and subjecting said seed to subnormal artificial temperatures of different degrees depending upon the age and moisture content of the seed.

8. A method of treating seeds of different ages, consisting in subjecting said seeds to subnormal artificial temperatures of different degrees, depending upon the age of the seed.

9. A method of treating seeds of different moisture contents, and subjecting said seed to subnormal artificial temperatures of different degrees depending upon the moisture content of the seed.

10. A method of treating seeds to accelerate germination thereof, consisting in employing subnormal artificial temperatures ranging in degrees of coldness from somewhat above absolute zero upwardly to $-20°$ C.; and subjecting said seeds to different degrees of temperature within said range dependent upon the condition of the seed.

11. A method of treating seeds to accelerate germination thereof when used consisting in employing subnormal artificial temperatures within a predetermined range; subjecting said seed to said subnormal temperatures; permitting rise of temperature of said seed above said subnormal temperatures; again subjecting said seed to said subnormal temperatures and again permitting rise of the temperature of the seed above said subnormal temperatures.

12. A method of treating seed to stimulate the growth of plants grown from said seeds consisting in employing subnormal artificial temperatures within a predetermined range subjecting said seed to said subnormal temperatures and permitting a rise of temperature of said seed to atmospheric temperatures.

13. A process which consists in the following steps: selecting seeds having impermeable casings, employing artificially induced cold below normal temperatures and subjecting said seeds thereto to engender germinability, and subsequently raising the temperature of said seeds to atmospheric temperatures.

14. A process which consists in selecting "hard seeds", and subjecting the same to low temperatures such as those corresponding to liquid air, thereby stimulating the growth of said seeds at atmospheric temperatures.

15. A method of the character described, consisting in the following steps: selecting leguminous seeds having factors retarding germination; employing intense artificial cold at subnormal temperatures, subjecting said seed to the influence of said subnormal temperatures, and subsequently subjecting said seed to increased temperatures prior to use, thereby augmenting the germinability of said seeds.

16. In an apparatus for treating seeds, the combination with means containing an artificial refrigerant at a very low temperature; of mechanism for conveying said material within the influence of said refrigerant and discharging the same therefrom, and means for subjecting the untreated seed to the pre-cooling influence of the treated seed being discharged.

17. In an apparatus for treating seeds, the combination with a container for refrigerant in the form of gases under greater than normal density; mechanism for conveying said seeds within the influence of said refrigerant and discharging the same therefrom, and means for subjecting the untreated seed to the cooling influence of treated seed being discharged.

18. In an apparatus for treating seeds, the combination with a container for refrigerant at low temperatures; mechanism for conveying said seeds within the influence of said refrigerant and discharging the same therefrom; and means for conveying the treated seed through the mass of untreated seed to pre-cool the latter prior to subjection of the same to the influence of said refrigerant.

19. In an apparatus for treating seeds, the combination with a container for refrigerant; mechanism for conveying said seeds within the influence of said refrigerant and discharging the same therefrom; means for pre-cooling the material prior to subjection of the same to the influence of said refrigerant; and devices for handling the seed fed to and discharged from said apparatus, said devices being arranged whereby the temperature of fresh material is beneficially affected by the temperature of the material following its subjection to the influence of said refrigerant.

20. A process for treating seeds to increase their germinability consisting in the following steps: providing air dry seed, some of which does not germinate because of the presence of an impermeable membrane in the seed, subjecting the seed to the influence of a suitable artificial refrigerant, for one or more times, allowing the temperature of the seed to rise after each application of the cooling medium.

21. A process for treating seeds to increase their germinability consisting in the following steps: providing air dry seed, some of which does not germinate because of the presence of an impermeable membrane in the seed, subjecting the seed to the influence of a suitable refrigerant, for one or more times, allowing the temperature of the seed to rise after each application of the cooling medium and storing the seed.

22. A process for treating seeds consisting in cooling them below −20° C. one or more times, and storing the seeds (at normal temperatures) after which the germinability of the "hard" seed is improved.

23. A process for accelerating the loss of the impermeability of seeds in storage, consisting in cooling the seeds by artificial means to below −20° C. one or more times.

24. A method of treating seeds consisting in subjecting said seed to subnormal artificial temperatures of different degrees depending upon the condition of the seed.

25. The herein described process of improving the germinability of seed, which consists in determining the moisture content of the seed to be treated, and then subjecting the seed to subnormal temperatures of different degrees in predetermined accordance with the moisture content thereof.

26. The herein described process of improving the germinability of the "hard seed" content of a batch of seed, which consists in rendering substantially uniform the moisture content of the seeds of the batch, and then subjecting the batch to a predetermined subnormal temperature.

27. The herein described process of improving the germinability of the "hard seed" content of a batch of seed, which consists in rendering substantially uniform the moisture content of the seeds of the batch, then subjecting the batch to a predetermined subnormal temperature, and then restoring the batch to normal temperature.

28. The herein described process of improving the germinability of the "hard seed" content of a batch of seed, which consists in regulating the moisture content of the seed to a point not over substantially ten per cent, lowering the temperture of the seed of the batch sufficiently to alter the characteristics of the shell of the "hard seed" content, and then restoring the temperature of the batch to normal.

29. The herein described process of improving the germinability of the "hard seed" content of a batch of seed, which consists in first determining the moisture content of the seed of the batch, then sufficiently lowering the temperature of the batch in predetermined relation to said moisture content to alter the characteristics of the shell of said "hard seed" content, and then restoring the temperature of the batch to normal.

In witness that I claim the foregoing I have hereunto subscribed my name this 10th day of October, 1928.

WARREN F. BUSSE.